US011618317B2

(12) United States Patent
Raisch et al.

(10) Patent No.: US 11,618,317 B2
(45) Date of Patent: Apr. 4, 2023

(54) TRANSMISSION AND AGRICULTURAL OR COMMERCIAL VEHICLE HAVING A TRANSMISSION

(71) Applicant: DEERE & COMPANY, Moline, IL (US)

(72) Inventors: Stefan Raisch, Vaihingen/Enz (DE); Rainer Gugel, Plankstadt (DE); Christoph Eisenhardt, Ludwigshafen (DE); David Mueller, Dettenheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/452,322

(22) Filed: Oct. 26, 2021

(65) Prior Publication Data

US 2022/0194221 A1    Jun. 23, 2022

(30) Foreign Application Priority Data

Dec. 18, 2020 (DE) .......................... 102020134114.8

(51) Int. Cl.
*B60K 17/28* (2006.01)
*B60K 5/12* (2006.01)

(52) U.S. Cl.
CPC ............ *B60K 17/28* (2013.01); *B60K 5/1208* (2013.01); *B60Y 2200/22* (2013.01)

(58) Field of Classification Search
CPC ........ B60K 17/28; B60K 5/1208; B60K 1/00; B60K 2001/001; B60K 2025/005;
(Continued)

(56) References Cited

U.S. PATENT DOCUMENTS 3,715,928 A * 2/1973 Case .......................... F16H 3/00
474/34
4,476,737 A * 10/1984 Young ..................... F16H 3/093
74/331
(Continued)

FOREIGN PATENT DOCUMENTS

JP           3445381 B2    9/2003
WO    WO2014096450 A1    6/2014

OTHER PUBLICATIONS

European Search Report issued in application No. 21210169.5, dated Jul. 11, 2022, 7pages.

*Primary Examiner* — Paul N Dickson
*Assistant Examiner* — Timothy Wilhelm
(74) *Attorney, Agent, or Firm* — Klintworth & Rozenblat IP LLP

(57) ABSTRACT

A transmission includes at least one primary transmission unit. The at least one primary transmission unit includes an input shaft having a first rotation axis, an output shaft having a second rotation axis, and a first layshaft having a third rotation axis. The input shaft, the output shaft, and the first layshaft are parallel. The first rotation axis lies in a first plane, the second rotation axis lies in a second plane, and the third rotation axis lies in a third plane. The first, the second, and the third planes are parallel. The first, the second and the third planes are orthogonal to a transmission central plane. The first rotation axis is disposed in the transmission central plane. The second plane is between the first and the third planes.

12 Claims, 6 Drawing Sheets

(58) Field of Classification Search
CPC ...... B60K 17/344; B60K 17/22; B60K 17/34; B60K 25/00; B60K 17/04; B60Y 2200/22; B60Y 2200/221
See application file for complete search history.

(56) References Cited

U.S. PATENT DOCUMENTS

| | | | | |
|---|---|---|---|---|
| 4,950,208 | A * | 8/1990 | Tomlinson | F16H 47/065 |
| | | | | 474/71 |
| 5,125,282 | A | 6/1992 | Bender et al. | |
| 5,385,064 | A * | 1/1995 | Reece | F16H 3/089 |
| | | | | 74/331 |
| 5,390,560 | A * | 2/1995 | Ordo | F16H 3/095 |
| | | | | 74/331 |
| 6,092,432 | A * | 7/2000 | Klaricic | F16H 63/3026 |
| | | | | 74/331 |
| 6,655,226 | B2 * | 12/2003 | Oguri | F16H 3/089 |
| | | | | 74/342 |
| 6,692,395 | B2 | 2/2004 | Rodeghiero et al. | |
| 6,758,301 | B2 | 7/2004 | Shiba et al. | |
| 7,467,564 | B2 * | 12/2008 | Baldwin | F16H 63/18 |
| | | | | 74/330 |
| 7,845,452 | B2 * | 12/2010 | Bennett | B60B 3/142 |
| | | | | 180/376 |
| 7,963,191 | B2 * | 6/2011 | Holmes | B60K 6/405 |
| | | | | 74/331 |
| 8,070,649 | B2 * | 12/2011 | Holmes | B60K 6/48 |
| | | | | 74/331 |
| 8,104,366 | B2 * | 1/2012 | Remmler | F16H 3/006 |
| | | | | 74/330 |
| 8,429,992 | B2 * | 4/2013 | Braford | F16H 3/093 |
| | | | | 74/331 |
| 8,474,342 | B2 * | 7/2013 | Thomas | F16H 3/006 |
| | | | | 74/331 |
| 8,474,343 | B2 * | 7/2013 | Thomas | F16H 3/006 |
| | | | | 74/331 |
| 8,567,273 | B2 * | 10/2013 | Mellet | F16H 3/006 |
| | | | | 74/331 |
| 8,763,485 | B2 * | 7/2014 | Thomas | F16H 3/006 |
| | | | | 74/330 |
| 8,844,391 | B2 * | 9/2014 | Braford | F16H 3/006 |
| | | | | 74/330 |
| 8,967,008 | B2 * | 3/2015 | Olson | F16H 3/006 |
| | | | | 74/331 |
| 8,967,009 | B2 * | 3/2015 | Mellet | F16H 3/093 |
| | | | | 74/331 |
| 8,984,974 | B2 | 3/2015 | Seitz et al. | |
| 8,992,378 | B2 * | 3/2015 | Holmes | B60K 6/48 |
| | | | | 192/84.6 |
| 9,127,729 | B2 * | 9/2015 | Tao | F16D 48/062 |
| 9,145,959 | B2 * | 9/2015 | Otten | F16H 37/042 |
| 9,829,072 | B2 * | 11/2017 | Osborn | F16H 3/093 |
| 10,696,289 | B2 * | 6/2020 | Shelton | B60W 10/113 |
| 2006/0048977 | A1 * | 3/2006 | Akashima | B62D 25/10 |
| | | | | 180/6.66 |
| 2007/0209902 | A1 * | 9/2007 | Muetzel | F16D 57/002 |
| | | | | 74/339 |
| 2010/0062893 | A1 * | 3/2010 | Antonov | F16H 3/66 |
| | | | | 475/275 |
| 2010/0107812 | A1 | 5/2010 | Otten et al. | |
| 2011/0088509 | A1 * | 4/2011 | Mohlin | F16H 3/006 |
| | | | | 74/665 E |
| 2011/0214521 | A1 * | 9/2011 | Rockenbach | F16H 3/089 |
| | | | | 74/331 |
| 2015/0292607 | A1 | 10/2015 | Heindl | |

* cited by examiner

TRANSMISSION AND AGRICULTURAL OR COMMERCIAL VEHICLE HAVING A TRANSMISSION

CROSS-REFERENCE TO RELATED APPLICATIONS

This application claims priority to German Patent Application Ser. No. 102020134114.8, filed Dec. 18, 2020, the disclosure of which is hereby incorporated by reference.

FIELD OF THE DISCLOSURE

The present disclosure relates to a transmission and to an agricultural or industrial commercial vehicle having a transmission.

BACKGROUND

A multiplicity of different transmissions, for example infinitely variable transmissions (IVT), partial power shift transmissions (PPST) or power shift transmissions (PST), are nowadays used in agricultural or industrial commercial vehicles, for example agricultural or industrial towing vehicles, such as tractors or prime movers. The transmission of a commercial vehicle here is generally embedded in a higher-level drivetrain architecture of the entire commercial vehicle. A customary drivetrain architecture provides a longitudinal architecture having a drive motor or motor which is disposed along a longitudinal axis of the commercial vehicle, thus an axis that runs in the longitudinal direction of the commercial vehicle, or along a forward-travel direction of the vehicle in a front half of the commercial vehicle. The commercial vehicle, in particular the drive motor, can moreover comprise a crankshaft which can be disposed in particular close to or along a vehicle central plane, in particular a vertical vehicle central plane. The commercial vehicle furthermore comprises a transmission which in turn includes a primary transmission unit. The ground-engaging means, for example wheels and/or chains and/or tracks, of the commercial vehicle can be driven by the transmission (propulsion, traction). The transmission, in particular the primary transmission unit, along the longitudinal axis, or counter to the forward-travel direction, respectively, is situated behind the drive motor in the direction of the rear end of the vehicle; the primary transmission unit can in particular be disposed directly on the drive motor. The input shaft of the transmission, in particular of the primary transmission unit, can be connected by the crankshaft of the motor and/or be able to be driven by said crankshaft. The crankshaft axes of the crankshaft and a first rotation axis of the input shaft of the motor can be aligned and/or disposed so as to be mutually coaxial. Alternatively, the crankshaft axis and the first rotation axis can be mutually displaced in parallel, or be disposed at a mutual angle. The output shaft of the transmission, in particular of the primary transmission unit, for driving the ground-engaging means can be able to be connected to a front and/or rear axle module. A force flux and/or torque flux from the drive motor by way of the crankshaft and the input shaft to the output shaft and onward to a front and/or rear drive axle, and thus to the ground-engaging means, is able to be established as a result.

It is disadvantageous here that in these commercial vehicles having the known drivetrain architecture the transmission requires excessive installation space along or in the direction of the longitudinal axis and/or a vertical axis of the commercial vehicle. As a result, the transmission requires installation space which could be utilized for additional components and/or a cab of the commercial vehicle. Moreover, the gravity of the commercial vehicle in the known drivetrain architectures has a large spacing from the support surface of the commercial vehicle, is thus displaced along the vertical axis in the direction of the cab, and is thus in particular disposed too high, such that the output and/or the roadworthiness and/or the road holding capability of the vehicle are/is compromised. A position of rotating components of the transmission, in particular in a state of the transmission installed in the commercial vehicle, for example of output shafts or layshafts, in which position the rotating components have a small spacing from the support surface of the commercial vehicle, thus along the vertical direction are displaced in the direction of the support surface, is considered disadvantageous because a disposal of rotating components in an oil sump of the transmission is considered disadvantageous in terms of the energy efficiency of the transmission. Likewise, it is customary for known transmissions to use only one or even no layshaft which, when viewed along or in the direction of the vertical axis, is disposed between the input shaft and the output shaft.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure is therefore based on the object of proposing a transmission and a commercial vehicle by way of which the aforementioned issues are overcome. To be proposed in particular are a transmission and a commercial vehicle by way of which a transmission diversity in a commercial vehicle, in particular taking into account technical and/or economic aspects, is able to be represented, and/or the transmission has a more compact construction mode, and/or the installation space, in particular below a cab and/or between the drive motor and the rear axle module, is able to be better utilized when using said transmission in a commercial vehicle, and/or the output and/or the roadworthiness and/or the road holding capability of the transmission and/or commercial vehicle are/is improved.

This object is achieved by a transmission having the features disclosed herein, or by an agricultural or industrial commercial vehicle including a transmission having the features disclosed herein.

Proposed according to the disclosure is a transmission for transmitting a torque generated by a drive motor, in particular an internal combustion engine or a diesel engine, to at least one front and/or rear drive axle of an agricultural or industrial commercial vehicle. The transmission comprises at least one primary transmission unit. The primary transmission unit in turn comprises an input shaft having a first rotation axis, in particular a longitudinal axis of the input shaft, and an output shaft, in particular a first output shaft, having a second rotation axis, in particular a longitudinal axis of the output shaft, and a first layshaft having a third rotation axis, in particular a longitudinal axis of the first layshaft. The input shaft and the output shaft and the first layshaft, thus in particular the first, the second and the third rotation axis, are disposed so as to be mutually parallel. The first rotation axis lies in a first plane, the second rotation axis lies in a second plane, and the third rotation axis lies in a third plane. The first, the second and the third plane are disposed so as to be mutually parallel, wherein the first, the second and the third plane are disposed and/or aligned so as to be orthogonal to a transmission central plane, thus a central plane of the transmission, in particular a vertical transmission central plane. The first rotation axis lies in the transmission central plane; the first rotation axis can be the line of intersection between the first plane and the transmission central plane. The second plane here is disposed between the first and the third plane.

In other words, the transmission is designed in such a manner that, in a state in which the transmission is installed in a commercial vehicle, the second plane is disposed between the first and the third plane. The first plane here can be disposed so as to be parallel to or congruent with a reference plane defined by the longitudinal and transverse extent of the commercial vehicle, in particular parallel to or congruent with a reference plane defined by the longitudinal axis and a transverse axis of the commercial vehicle. The first plane here can be aligned so as to be parallel to the longitudinal axis of the commercial vehicle, or the longitudinal axis of the commercial vehicle can lie in the first plane. The second and the third plane can be disposed so as to be offset from the first plane along a vertical axis or a vehicle central plane, thus a central plane of the commercial vehicle, in particular a vertical vehicle central plane, thus a vertical central plane of the commercial vehicle, in the direction of a support surface of the commercial vehicle.

The input shaft can be rotatable about the first rotation axis. The first rotation axis can in particular be the longitudinal axis of the input shaft, thus in particular the axis running in the longitudinal direction of the input shaft. The output shaft can be rotatable about the second rotation axis. The second rotation axis can in particular be the longitudinal axis of the output shaft, thus in particular the axis running in the longitudinal direction of the output shaft. The first layshaft can be rotatable about the third rotation axis. The third rotation axis can in particular be the longitudinal axis of the first layshaft, thus in particular the axis running in the longitudinal direction of the first layshaft.

In terms of the disclosure it is essential that the second plane, thus in particular the output shaft, in a direction orthogonal to the second plane along the transmission central plane or in relation to the latter, is disposed between the first plane, thus in particular the input shaft, and the third plane, thus in particular the first layshaft. In a state in which the transmission is installed in a commercial vehicle, the transmission central plane and the vehicle central plane can be parallel or congruent, and/or the transmission central plane and the vertical axis of the commercial vehicle can be parallel or congruent, the vertical axis thus lying in the transmission central plane. The second plane, in particular the output shaft, in a direction orthogonal to the second plane along or in relation to the transmission central plane and the vehicle central plane or the vertical axis of the commercial vehicle, here can be disposed between the first plane, in particular the input shaft, and the third plane, in particular the first layshaft. A direct spacing between the input shaft and the output shaft here can be smaller than a spacing between the input shaft and the first layshaft. The spacing of the first layshaft from a support surface of the commercial vehicle can thus in particular be smaller than the spacing of the output shaft from the support surface, and the latter spacing in turn be smaller than the spacing of the input shaft from the support surface. The transmission, in particular also in a state installed in the commercial vehicle, can thus be advantageously constructed as follows. The input shaft having the first rotation axis or the longitudinal axis of the input shaft can be considered to be the reference line. The output shaft having the second rotation axis or the second longitudinal axis can be disposed so as to be displaced from said input shaft line along the transmission central plane but so as to be parallel to said input shaft, thus be in particular disposed below the input shaft. The first layshaft can be in turn disposed so as to be displaced from the output shaft along the transmission central plane but so as to be parallel to said output shaft, thus be in particular disposed below the output shaft. The second plane here is disposed between the first and the third plane, and the first, the second and the third plane are orthogonal to the transmission central plane. As a result, the transmission along or in the direction of the transmission central plane, thus in particular also along the vertical axis or the vehicle central plane, and/or along or in the direction of the first and/or the second and/or the third plane advantageously has a more compact construction mode. Moreover, the transmission is in a state in which the transmission is installed in a commercial vehicle, essentially in a disposal plane shared with the crankshaft axes and the first rotation axis. As a result, an optimization of the installation space of the transmission and of the commercial vehicle, thus a more compact construction mode, is advantageously achieved in particular in terms of a lightweight construction mode of the commercial vehicle. Additional installation space for components outside the transmission is likewise enabled. Moreover, the cab can be disposed lower down, thus in the direction of a support surface of the commercial vehicle, than known cabs in commercial vehicles. Moreover, in comparison to the centers of gravity of known transmissions and commercial vehicles, the center of gravity of the transmission according to the disclosure and of the commercial vehicle according to the disclosure in the direction of the third plane is advantageously displaced along the transmission central plane and/or the vehicle central plane, or the vertical axis, respectively, of the commercial vehicle. In other words, the center of gravity of the transmission according to the disclosure and of the commercial vehicle according to the disclosure advantageously has a smaller spacing from the support surface of the commercial vehicle than the center of gravity of known transmissions and commercial vehicles, in the direction of the support surface of the commercial vehicle is thus in particular displaced along the vertical axis. As a result, the output and/or the roadworthiness and/or the road holding capability of the commercial vehicle can advantageously be improved.

In a design embodiment of the disclosure, a first orthogonal spacing between the second and the third plane is at least one quarter of a second orthogonal spacing between the first and the second plane. In general, the amount of the spacing between two parallel planes, in particular the amount of the spacing between a point in one of the planes and a point in the further plane, can be defined as the orthogonal spacing between two planes. In general, the determination of the spacing of two planes lying to be mutually parallel $E:\vec{n}_E \circ (\vec{X}-\vec{A})$ and $F:\vec{n}_F \circ (\vec{X}-\vec{B})$ thus can be traced back to the determination of the spacing of an arbitrary point $P \in F$ from the plane E. The space point B of the plane equation of F is expediently chosen. The spacing between the planes E and F, thus the orthogonal spacing defined here, is thus:

$$d(F;E) = d(B;E) \text{ where } F \| E$$

The first orthogonal spacing can be the orthogonal spacing between the second and the third plane, and the second orthogonal spacing can be the orthogonal spacing between the first and the second plane. The first orthogonal spacing D1 between the second plane E (reference sign 114, see below) and the third plane F (reference sign 116, see below) which are present in the form described above is thus as follows:

$$D1=d(F;E)=d(B;E) \text{ where } F\|E$$

The second orthogonal spacing D2 between the second plane E (reference sign 114, see below), the latter being present in the form described above, and the first plane G where $G:\vec{n}_G \circ (\vec{X}-\vec{C})$ (reference sign 112, see below) can be determined or calculated, respectively, as follows:

$$D2=d(G;E)=d(C;E) \text{ where } G\|E$$

The first and the second orthogonal spacing can especially also be determined, in particular calculated, in that a first linear spacing orthogonal to the first, the second and the third plane is imagined, in particular applied, wherein the first linear spacing intersects the first rotation axis. The amount of the spacing, or the spacing vector, respectively, between the intersection points of the first linear spacing and the second and the third plane can in this instance be able to be determined as the first orthogonal spacing, and the amount of the spacing, or of the spacing vector, respectively, between the intersection points of the linear spacing and the first and the second plane can in this instance be able to be determined as the second orthogonal spacing. In other words, the first orthogonal spacing can be the spacing between the second and the third plane, said spacing being in particular able to be detected or measured, respectively, along the central plane. The second orthogonal spacing can be the spacing between the first and the second plane along the central plane. The orthogonal spacing of the third plane from the first plane can thus be the sum of the first and the second orthogonal spacing. The second orthogonal spacing here can be at least 50 mm. The first orthogonal spacing can be at least one quarter of the second orthogonal spacing, in particular thus ≥25% of the second orthogonal spacing, ≥50% of the second orthogonal spacing, or ≥75% of the second orthogonal spacing. The following does thus at least apply:

$$D1 \geq \tfrac{1}{4} \times D2$$

In the state in which the transmission is installed in a commercial vehicle, the second plane, in particular the output shaft, in the direction of the support surface along or in terms of the vehicle central plane or the vertical axis of the commercial vehicle, can be displaced from the input shaft, in particular the first plane, by the second orthogonal spacing. The third plane, in particular the first layshaft, in the direction of the support surface along or in terms of the vehicle central plane or the vertical axis of the commercial vehicle, can be displaced by the first orthogonal spacing, wherein the first orthogonal spacing is at least one quarter of the second orthogonal spacing. In other words, the first layshaft, along or in the direction of the transmission central plane and/or the vehicle central plane or the vertical axis of the commercial vehicle, along or in the vertical direction of the commercial vehicle can be disposed in particular below the output shaft, wherein the abovementioned condition pertaining to the correlation between the first and second orthogonal spacings applies. As a result of the first orthogonal spacing being at least one quarter of the second orthogonal spacing, the abovementioned advantages can be achieved, in particular thus a more compact construction mode of the transmission, as a result of which more installation space and/or an improved position of the center of gravity of the transmission and of the commercial vehicle and/or an improved symmetry of the commercial vehicle are/is provided.

In a design embodiment of the disclosure, a third orthogonal spacing between the second rotation axis and the transmission central plane is at least one quarter of the second orthogonal spacing between the first and the second plane. It is understood that the second rotation axis here is parallel to the central plane. The amount of the spacing between a straight line and a plane parallel to the latter can be defined as third orthogonal spacing. In general, the amount of the spacing between a parallel straight line and a plane can be defined as the orthogonal spacing between a straight line and a plane. In general, the determination of the spacing of a straight line $g:\vec{X}=\vec{A}+\alpha \cdot \vec{u}$, where $\alpha \in \mathbb{R}$ and a plane $H:\vec{n}_H \circ (\vec{X}-\vec{D})$ which lie so as to be mutually parallel can be traced to the determination of the spacing of an arbitrary point $P \in g$ from the plane H. The space point A of the linear equation of g is expediently chosen. The spacing between the straight line g and the plane H, thus the orthogonal spacing defined here, is thus:

$$d(g;H)=d(A;H) \text{ where } g\|H$$

The third orthogonal spacing can be the orthogonal spacing between the second rotation axis and the transmission central plane. The third orthogonal spacing D3 between the second rotation axis g (reference sign 106, see below) and the transmission central plane H (reference sign 118, see below), being present in the form described above, is thus as follows:

$$D3=d(g;H)=d(A;H) \text{ where } g\|H$$

The third orthogonal spacing can especially be determined, in particular calculated, in that a second linear spacing orthogonal to the central plane and orthogonal to the second rotation axis is imagined, in particular applied or configured, wherein the second linear spacing lies in the second plane. The third orthogonal spacing in this instance can be determined, in particular calculated, as the amount of the spacing, or the spacing vector, respectively, between the intersection points of the second linear spacing and the central plane and the second rotation axis. The third orthogonal spacing can be at least one quarter of the second orthogonal spacing, in particular thus ≥25% of the second orthogonal spacing, ≥50% of the second orthogonal spacing, or ≥75% of the second orthogonal spacing. The following does thus at least apply:

$$D3 \geq \tfrac{1}{4} \times D2$$

As a result, the position of the output shaft in terms of the transmission central plane or vehicle central plane can be disposed so as to be offset from the position of the input shaft and the first layshaft, in particular in the horizontal direction of the commercial vehicle. In other words, the output shaft along or in the direction of the second plane can have a displacement from the transmission central plane, in particular from the input shaft, wherein the abovementioned condition pertaining to the correlation between the second and third orthogonal spacings applies. The same applies to the transmission in a state installed in the commercial vehicle when the transmission central plane is parallel to or congruent with the vehicle central plane. The output shaft in this instance, along or in the direction of the second plane, can have a displacement from the input shaft, in particular from the vehicle central plane, wherein the abovementioned condition pertaining to the correlation between the second and third orthogonal spacings applies. As a result of the third orthogonal spacing being at least one quarter of the second orthogonal spacing, the abovementioned advantages for the transmission and the commercial vehicle can be achieved.

In a design embodiment of the disclosure the primary transmission unit comprises a second layshaft having a fourth rotation axis, and/or the fourth rotation axis lies in a fourth plane. The fourth plane can be disposed so as to be parallel to the first, the second and the third plane. The fourth plane can be disposed between the first and the third plane, or between the first and the second plane. The fourth plane can however also be congruent with the second plane. A force flux and/or torque flux from the input shaft to the first layshaft can advantageously be established by the second layshaft. As a result, the spacing between the input shaft and the first layshaft can advantageously also be bridged. Further layshafts, for example a third and/or a fourth and/or a fifth layshaft, can also be provided so as to fulfill additional functions if required. Alternatively, a chain by way of which advantageously a force flux and/or torque flux from the input shaft to the first layshaft can be established can be provided instead of a second layshaft.

In one example embodiment, a force flux and/or torque flux between the input shaft and the output shaft is able to be established only indirectly. Likewise, a force flux and/or torque flux between the second layshaft and the output shaft is able to be established only indirectly. A force flux and/or torque flux between the output shaft and the first layshaft is able to be established only directly. A force flux and/or torque flux between the second layshaft and the input shaft can be able to be established only directly.

In a design embodiment of the disclosure the transmission, in particular the primary transmission, comprises a further output shaft, in particular a second output shaft. The further output shaft can have a fifth rotation axis, in particular a longitudinal axis of the further output shaft. The fifth rotation axis can lie in a fifth plane. The fifth plane can be disposed between the first and the third plane, or between the first and the second plane or the second and the third plane. The further output shaft can be provided for driving the front ground-engaging means of the commercial vehicle and/or be able to be connected to the front axle module. As a result, a force flux and/or torque flux between the second output shaft and the front drive axle can be able to be established such that an output can be transmitted to the front drive axle of the commercial vehicle, for example. Thus, a separate force flux and/or torque flux from the first output shaft to the rear drive axle and from the second output shaft to the front drive axle can advantageously be able to be established.

In a design embodiment of the disclosure the transmission comprises a transmission housing which receives the primary transmission unit, and/or the transmission housing is configured and disposed in such a manner that a rear axle module is disposed, in particular directly or immediately, on the transmission housing, and/or a torque flux between the primary transmission unit and the rear axle module is able to be established, in particular able to be established directly. The transmission can comprise a transmission housing which can receive the primary transmission unit, and/or a rear axle housing which can receive the rear axle module. The transmission housing can have a transmission faceplate. The transmission housing in a state installed in the commercial vehicle can at all times have substantially the same installation space, thus independently of the number of layshafts, and/or be installed in the same installation space in the commercial vehicle. The rear axle housing can have a cover. The rear axle housing in a state installed in the commercial vehicle can at all times substantially have the same installation space and/or be installed in the same installation space in the commercial vehicle. The transmission housing and/or the rear axle housing can be configured in one part or multiple parts. A transmission housing configured in one part can in particular be understood to mean that the housing portion that surrounds the primary transmission unit, with the exception of the housing faceplate, is made from one part, for example can be produced from a casting. A rear axle housing which is configured in one part can in particular be understood to mean that the housing portion that surrounds the rear axle module, with the exception of the cover, is made from one part, for example can be produced from a casting. The transmission housing and/or the rear axle housing in this case can have an opening which is able to be closed by the housing faceplate or the cover, respectively. Despite the transmission housing overall in this instance being formed by the housing portion that surrounds the primary transmission unit and by the housing faceplate, this is nevertheless to be considered to be a transmission housing configured in one part. The same applies to the rear axle housing which, despite the rear axle housing overall in this instance being formed by the housing portion that surrounds the rear axle module and by the cover, is nevertheless to be considered to be a rear axle housing configured in one part. The housing faceplate and/the cover can externally close off the transmission housing and/or the rear axle housing without however receiving therein components of the transmission. The transmission housing and/or the rear axle housing can receive therein components of the transmission. The transmission housing here can in particular receive the primary transmission unit. The components or parts of the primary transmission unit or of the rear axle module, respectively, can be assembled and/or serviced or repaired, respectively, through an opening of the transmission housing and/or an opening of the rear axle housing. As an alternative to a transmission housing and/or a rear axle housing configured in one part, said transmission housing and/or rear axle housing can also be configured in two parts or multiple parts. For example, the transmission housing and/or the rear axle housing could be assembled from two parts of substantially identical size, wherein the transmission housing thus assembled receives, or at least largely surrounds, the primary transmission unit, and/or the rear axle housing receives, or at least largely surrounds, the rear axle module, with said transmission housing and/or said rear axle housing being optionally able to be closed off by a housing faceplate or the cover, respectively. The rear axle module, in particular the rear axle housing, can be disposed directly or immediately on the transmission housing. The transmission can moreover comprise a coupling element. The coupling element can be disposed on the input shaft. In a state installed in the commercial vehicle, a rotationally fixed connection can be able to be established between the drive motor, in particular the crankshaft or a driveshaft of the drive motor, and the coupling element or the input shaft, said rotationally fixed connection potentially being established by way of a shaft-to-hub connection. As a result, a torque flux between the primary transmission unit and the rear axle module can be able to be established, in particular be able to be established directly. Overall, a simple production or assembly, respectively, of the transmission can be enabled as a result of these measures. When the housing parts are assembled on one another, the transmission is at least largely assembled and in principle functionally ready.

In a design embodiment of the disclosure the rear axle module comprises a rear drive axle and/or a rear axle differential. The rear axle module, in particular the rear axle differential, can comprise a rear axle pinion, for example a drive bevel gear or a bevel pinion, and a rear axle gear wheel, for example a bevel gear wheel or a crown gear wheel. The rear axle housing can receive the rear axle module, in particular the rear axle differential and/or at least partially the rear drive axle. A modular and/or compact construction of the transmission is advantageously able to be implemented as a result.

In one advantageous refinement of the transmission, the transmission comprises a power take-off module. The rear axle module, in particular the rear axle housing, can be disposed between the power take-off module and the primary transmission unit. The transmission can comprise a power take-off driveshaft, wherein the power take-off module can in particular be able to be driven by a power take-off driveshaft. The power take-off driveshaft can in particular be disposed in the input shaft. A power take-off housing can receive the components of the power take-off module. The components of the power take-off module can be the power take-off driveshaft and/or the power take-off shaft stub as well as the power take-off gear. The power take-off driveshaft can be embodied as a solid shaft. The input shaft of the transmission can be configured as a hollow shaft. The input shaft can receive therein the power take-off driveshaft. The power take-off driveshaft, in a state in which the transmission is installed in the commercial vehicle, can be able to be driven by the drive motor, in particular also be coupled in such a manner that the power take-off driveshaft is able to be driven by the drive motor. The power take-off module, in particular the power-take off gear, by way of the power take-off driveshaft for driving can thus be operatively connected to, or be able to be driven, by the drive motor via the input shaft, in particular also by the rear axle module. In this way, a direct and thus particularly energy-efficient transmission of a drive output from the drive motor to a power take-off module, in particular a power take-off output, of the commercial vehicle is possible.

In an example embodiment which is advantageous in terms of construction the transmission comprises a pump gear, and/or the pump gear is disposed on or in the rear axle module and able to be driven by the power take-off driveshaft. In a design embodiment of the disclosure, the transmission can comprise a first pump, wherein the first pump is able to be driven by the pump gear. The pump gear can be disposed in the rear axle module; the pump gear can in particular be connected to the power take-off driveshaft, in particular be able to be connected to the latter in a releasable and rotationally fixed manner. The pump gear can comprise one or a plurality of spur gears, so-called idlers, so as to transmit a force flux and/or a torque flux to a first pump, in particular a pump output of the first pump. In a state in which the transmission is installed in a commercial vehicle, at least one hydraulic system, in particular a primary hydraulic system of the vehicle, can be driven by the pump gear. The pump gear can be horizontally offset from the rear axle differential. By way of this measure the pump gear can advantageously be designed in a simple manner in terms of construction. The first pump can be disposed on or outside the rear axle module, in particular on a pump holder, for example a plate. The first pump can comprise a pump shaft, for example a pump output, such as a through shaft, which is able to be connected, in particular coupled, to the pump gear and/or able to be driven by the latter. The transmission can also comprise a second pump. The first and the second pump can be able to be driven by the pump shaft such that the second pump is advantageously also able to be driven directly by the pump gear. The first pump can be disposed between the second pump and the pump gear. The first pump by way of the pump shaft can be able to be connected to the pump gear and/or be able to be driven by the latter. Moreover, the second pump can be disposed immediately or directly, respectively, on the first pump. As a result, the first and the second pump can advantageously be stacked on top of one another. The first pump here can especially comprise the pump shaft which is configured as a through shaft and is connected to the pump gear and/or able to be driven by the pump gear. The second pump in this instance can likewise be connected to the through shaft and/or be able to be driven by the pump gear. As a result, the first and the second pump can advantageously be able to be driven immediately or directly, respectively, by the pump gear, and in particular by means of only one pump shaft. The first and/or the second pump can be disposed on or outside the rear axle module. The first and/or the second pump, in a state in which the transmission is installed in a commercial vehicle, along or in terms of the vehicle central plane or the vertical axis of the commercial vehicle, can be disposed between the second and the third plane, or in the third plane, or else between the third plane and the support surface. An additional charging pump for the hydraulic system can advantageously be dispensed with as a result. Moreover, this enables the first and/or the second pump to be operated as a self-priming pump.

The disclosure furthermore relates to an agricultural or industrial commercial vehicle, in particular a tractor or prime mover or a construction machine. The agricultural or industrial commercial vehicle comprises a transmission, in particular a transmission as claimed in one of claims 1 to 12. The commercial vehicle according to the disclosure has the above-described advantages of the transmission according to the disclosure. In a design embodiment of the disclosure, the agricultural or industrial commercial vehicle comprises a drive motor and the transmission, wherein by way of the transmission a torque generated by the drive motor is in particular able to be transmitted to at least one front and/or rear drive axle of the commercial vehicle. The transmission comprises at least one primary transmission unit, and the primary transmission unit comprises an input shaft having a first rotation axis and an output shaft having a second rotation axis and a first layshaft having a third rotation axis. The input shaft and the output shaft and the first layshaft are disposed so as to be mutually parallel. The first rotation axis lies in a first plane, the second rotation axis lies in a second plane, and the third rotation axis lies in a third plane. The first, the second and the third plane are disposed so as to be mutually parallel, wherein the first, the second and the third plane are disposed, in particular aligned, so as to be orthogonal to a transmission central plane. The first rotation axis here is disposed in the transmission central plane. Moreover, the second plane is disposed between the first and the third plane. The transmission is disposed in the commercial vehicle in such a manner that the transmission central plane is substantially parallel to or congruent with the vehicle central plane, in particular that the transmission central plane is parallel to or congruent with the vehicle central plane. The first plane is disposed so as to be substantially parallel to or congruent with a reference plane defined by the longitudinal and transverse extent of the commercial vehicle, said first plane being in particular parallel to or congruent with the latter. The second and the third plane, in particular along a vertical axis or the vehicle central plane, respectively, are disposed so as to be offset from the first plane in a direction of a support surface of the commercial vehicle. The agricultural or industrial commercial vehicle can comprise a cab and a chassis, wherein the cab can be disposed on, in particular on top of, the chassis. The transmission possesses an input shaft, the axial position thereof potentially being determined by the position of the crankshaft of the drive motor. The output shaft can be longitudinally oriented and be in the same vertical position as the rear drive axle, the axis of the latter potentially being coaxial with the rear wheels. Likewise, the further output shaft can be longitudinally oriented and be in the same vertical position as the front drive axle, the axis of the latter potentially being coaxial with the front wheels. The output shaft can be set toward one side of the commercial vehicle. The front and the rear drive axle can be able to be driven by the output shaft, in particular the first output shaft. However, the rear drive axle can also be able to be driven by the first output shaft, and the front drive axle can also be able to be driven by the second output shaft. The commercial vehicle according to the disclosure advantageously has a construction mode which is significantly narrower and/or more compact, and/or the transmission requires less installation space. The commercial vehicle moreover has a center of gravity which in comparison to known commercial vehicles is displaced in the direction of the support surface.

The transmission according to the disclosure, in particular the primary transmission unit, and the commercial vehicle according to the disclosure comprise a fundamental architecture of a transmission having an input shaft, an output shaft and a layshaft and the mutual spatial disposal and orientation of said shafts. This spatial disposal and orientation can be used in various types of transmissions, in particular in conventional power shift transmissions (PST) and partial power shift transmissions (PPST) and infinitely variable transmissions (IVT). The disposal of the components of the transmission, thus in particular of the gear wheel or gear wheels and/or clutches and/or shifting elements, here can be manifold and diverse as long as the conditions pertaining to the spatial disposal and orientation of the components of the transmission according to the disclosure and/or the commercial vehicle according to the disclosure are met. Moreover, the transmission and/or the commercial vehicle can have the following alternative configurations and arrangements. The second and further layshafts can comprise idlers, thus in particular have gear wheels which are for example supported directly on the transmission housing and engage with two other gear wheels which are disposed on two different shafts. The crankshaft axes of the crankshaft and a first rotation axis of the input shaft of the motor can be disposed so as to be mutually offset or at a mutual angle. The input shaft of the transmission, in particular of the primary transmission unit, can be connected either directly or indirectly to the crankshaft of the motor, and/or be driven directly or indirectly by the latter, for example by way of a driveshaft or by way of a coupling element or by way of a splined or screwed connection. Likewise, the output shaft and the rear drive axle along or in the direction of the vertical axis of the commercial vehicle can be mutually offset, thus in particular be vertically offset in relation to one another, for example by way of a hypoid gear wheel set. The rear drive axle and the independent rear wheel suspensions can be mutually offset. The crankshaft axes and thus the crankshaft can be horizontally offset from the vehicle central plane. The transmission and/or the commercial vehicle can likewise have further interfaces for delivering output to the front wheel drive, to the power take-off and to auxiliary drives, for example pumps, etc.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The disclosure as well as further advantages and advantageous refinements and design embodiments of the disclosure in terms of devices as well as in terms of method technology will be explained in more detail hereunder by means of example embodiments and with reference to the drawings. Components which in terms of their function are identical or comparable, respectively, are provided with the same reference signs herein. The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the present disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

Figure 1:
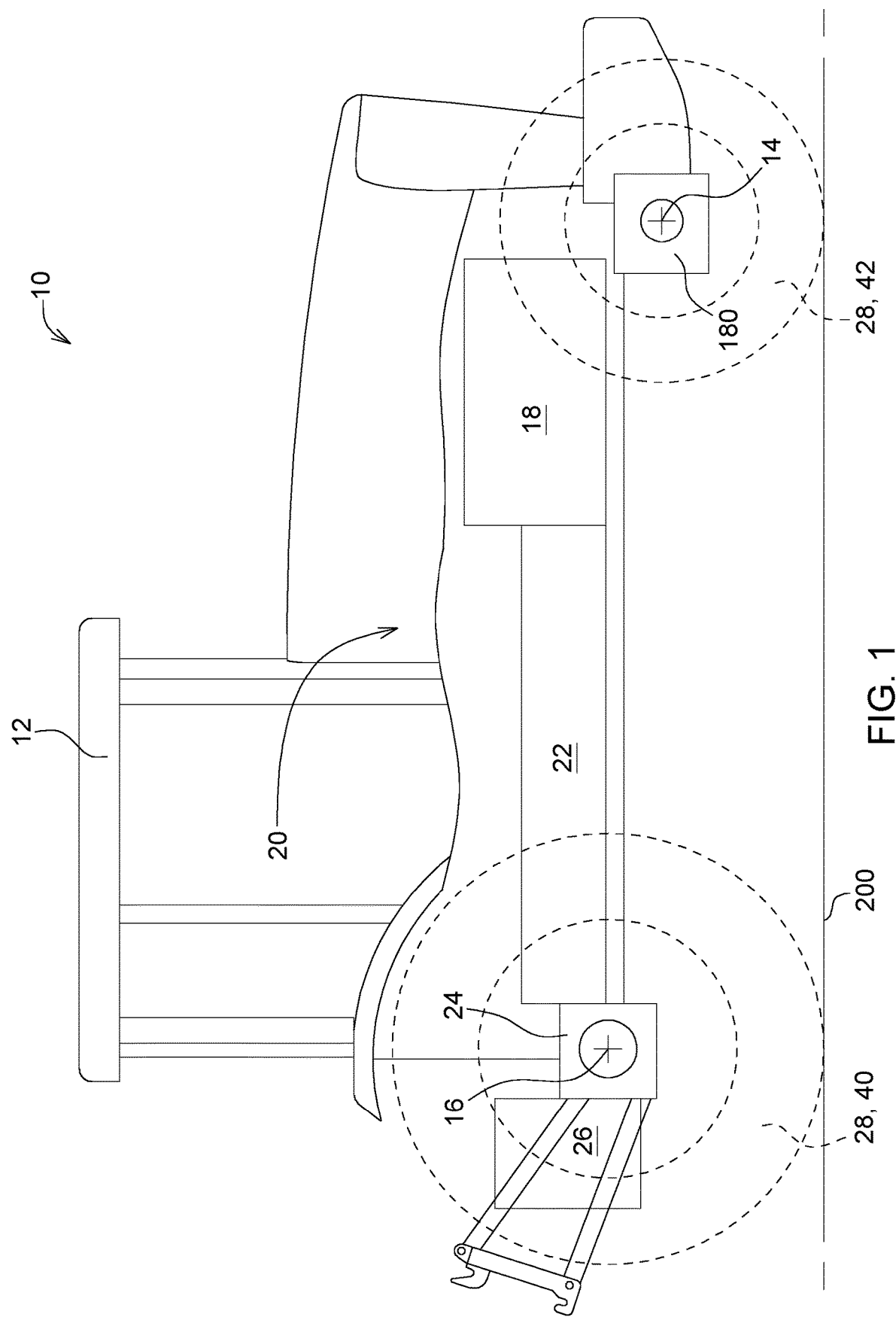
FIG. 1 shows a schematic illustration of a first example embodiment of an agricultural or industrial commercial vehicle according to the disclosure, having a transmission according to the disclosure.

FIG. 1 shows a schematic illustration of a first example embodiment of an agricultural or industrial commercial vehicle 10 according to the disclosure, having a transmission 20 according to the disclosure. The fundamental construction of a commercial vehicle 10 is assumed to be known to the person skilled in the art. The commercial vehicle 10 comprises a cab 12, a front drive axle 14 and a rear drive axle 16. The rear drive axle 16 can be permanently driven, and the front drive axle 14 can be permanently driven or activated on demand.

The commercial vehicle 10 furthermore comprises a drive motor 18 which can be embodied as an internal combustion engine. The transmission 20 has a transmission structure which, as described hereunder, can be assembled from different individual transmission modules. The presently described transmission structure in the force flux and torque flux, proceeding from the drive motor 18, can have a transmission 20 according to the disclosure, and a rear axle module 22, and a power take-off module 24.

The transmission 20, in particular a primary transmission unit 22, counter to the forward-travel direction (see FIGS. 4 and 5, reference sign 300), of the commercial vehicle and/or along a longitudinal axis (see FIGS. 4 and 5, reference sign 52) of the commercial vehicle here is disposed downstream of the drive motor 18. The transmission 20, in particular the primary transmission unit 22, for driving is operatively connected to the drive motor 18 and/or can be able to be driven by the drive motor 18. The rear axle module 22 is disposed downstream of the primary transmission unit 22. The rear axle module 22 here for driving is operatively connected to the primary transmission unit and/or able to be driven by the latter. By way of the transmission 20 shown, a moment of force and a torque, thus the drive output, of the drive motor 18 can be transmitted by way of different gear stages to the output shaft (see FIGS. 2 to 6, reference sign 104) and/or a further output shaft (see FIG. 4, reference sign 120) of the transmission 20.

The output shaft 104 in turn for driving can be operatively connected to the rear and/or the front drive axle 14, 16. Or else the output shaft 104 for driving can likewise be operatively connected to the rear drive axle 16, and the further output shaft 120 for driving can be operatively connected to the front drive axle 14. The front and/or the rear drive axle 14, 16 can thus be able to be driven by the output shaft 104; a moment of force and a torque can thus in particular be transmitted from the output shaft 104 to the front and/or the rear drive axle 14, 16. However, the rear drive axle 16 can also be able to be driven by the output shaft 104, and/or the front drive axle 14 can be able to be driven by the further output shaft 120; a moment of force and a torque can in particular be transmitted from the output shaft 104 to the rear drive axle 16 and/or a moment of force and a torque can be transmitted from the further output shaft 120 to the front drive axle 14. The front and/or the rear drive axle 14, 16 convert a rotation of the output shaft 104 and/or of the further output shaft 120 into a rotation of one or a plurality of ground-engaging means 28, and thus into a propulsion of the commercial vehicle. The commercial vehicle, as a function of a gear stage selected in the transmission 20, in particular in the primary transmission unit 22, can therefore be driven at different rotating speeds. Consequently, a commercial vehicle 10 equipped with the transmission 20, as a function of the gear stage selected in the transmission, is able to be moved in different speed ranges.

The towing vehicle 10 can have one or a plurality of ground-engaging means 28, here illustrated in the form of wheels 40, 42, which for transmitting drive forces engage with a surface and/or by way of which the towing vehicle 10 is supported on the surface. The towing vehicle 10 can moreover have a chassis, wherein the chassis can in particular be supported by the wheels 28 suspended on the front and the rear drive axle 14, 16.

Figure 2:
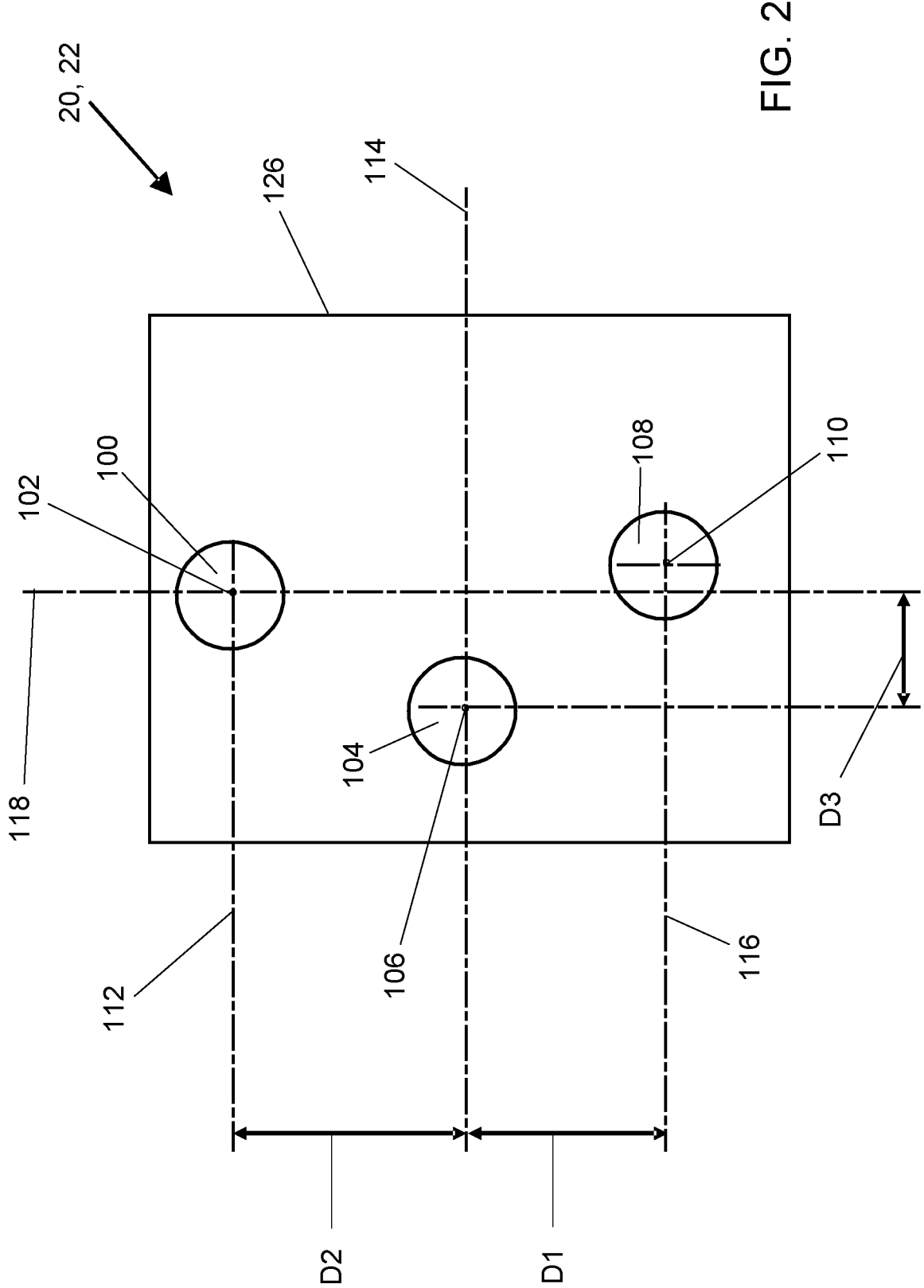
FIG. 2 shows a schematic illustration of a first example embodiment of the transmission according to the disclosure.

FIG. 2 shows a schematic illustration of a first example embodiment of the transmission 20 according to the disclosure. The transmission 20 shown in FIG. 2 is a detailed schematic illustration of the transmission 20, in particular of the primary transmission 22, shown in FIG. 1. Therefore, only those details not shown in FIG. 1 will be discussed hereunder. The commercial vehicle 10 can comprise the transmission 20 as illustrated in FIG. 2.

The at least one primary transmission unit 22 of the transmission 20 comprises an input shaft 100 having a first rotation axis 102, and an output shaft 104 having a second rotation axis 106, and a first layshaft 108 having a third rotation axis 110. The input shaft 100 and the output shaft 104 and the first layshaft 108 are disposed so as to be mutually parallel, wherein the first rotation axis 102 lies in a first plane 112, the second rotation axis 106 lies in a second plane 114, and the third rotation axis 110 lies in a third plane 116. The first, the second and the third plane 112, 114, 116 are likewise disposed so as to be mutually parallel, wherein the first, the second and the third plane 112, 114, 116 are disposed so as to be orthogonal to a transmission central plane 118, and the first rotation axis 102 is disposed in the transmission central plane 118. The second plane 114, thus the plane in which the output shaft 104 is disposed, is disposed between the first and the third plane 112, 116. The transmission 20 can moreover comprise a transmission housing 126 which receives the primary transmission unit 22. It is essential to the disclosure that, by virtue of the disposal described, the second plane 114, in particular the output shaft 104, along or in terms of the transmission central plane 118, in a direction orthogonal to the second plane is disposed between the first plane 112, in particular the input shaft 100, and the third plane 116, in particular the first layshaft 108. As a result, an optimal compact packing density of the transmission 20, in particular of the primary transmission unit 22, can advantageously be achieved, this being in particular a compact spatial disposal of the input shaft 100, the output shaft 104, and the first layshaft 108 in the transmission housing 126. In comparison to known transmissions, the center of gravity along the transmission central plane 118, in a direction orthogonal to the second plane, can thus advantageously be displaced in the direction of the third plane 116.

A first orthogonal spacing D1 between the second and the third plane 114, 116 can especially be at least one quarter of a second orthogonal spacing D2 between the first and the second plane 112, 114. The following thus applies:

$$D1 \geq \tfrac{1}{4} \times D2$$

Furthermore, a third orthogonal spacing D3 between the second rotation axis 106 and the transmission central plane 118 can be at least one quarter of the second orthogonal spacing D2 between the first and the second plane 112, 114. The following thus applies:

$$D3 \geq \tfrac{1}{4} \times D2$$

By virtue of these additional parameters, an optimal and/or compact spatial packaging density of the transmission 20, for example the primary transmission unit 22, can advantageously be achieved, this being in particular a compact spatial disposal of the input shaft 100, the output shaft 104 and the first layshaft 108 in the transmission housing 126.

Figure 3:
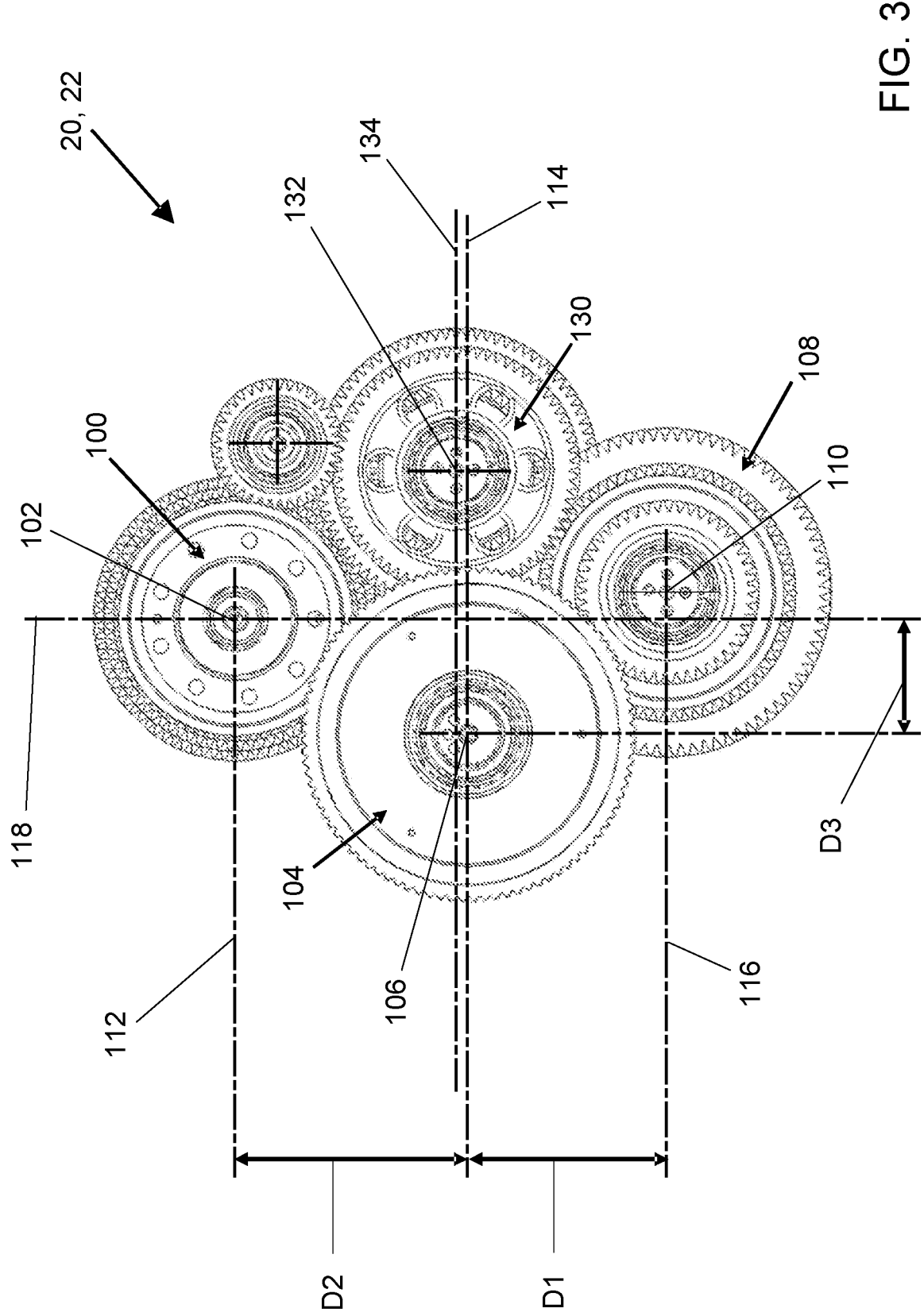
FIG. 3 shows a schematic illustration of a second example embodiment of the transmission according to the disclosure.

FIG. 3 shows a schematic illustration of a second example embodiment of the transmission 20 according to the disclosure. The transmission 20 shown in FIG. 3 substantially corresponds to the transmission 20 shown in FIGS. 1 and 2 such that only details and/or points of differentiation will be discussed hereunder. The commercial vehicle 10 can comprise the transmission 20 as illustrated in FIG. 3. The primary transmission unit 22 comprises a second layshaft 130 having a fourth rotation axis 132. The fourth rotation axis 132 lies in a fourth plane 134. The fourth plane 134 is disposed so as to be parallel to the first, the second and the third plane 112, 114, 116. The fourth plane 134 is disposed between the first and the second plane 112, 114. The fourth plane 134 can however also be disposed between the second and the third plane 114, 116, or in the second plane 114. As a result, a torque flux between the input shaft 100 and the output shaft 104 and/or a torque flux between the second layshaft 130 and the output shaft 104 can be able to be established only indirectly. Moreover, a torque flux between the output shaft 104 and the first layshaft 108 can be able to be established only directly. As a result, a spacing of the input shaft 100 from the first layshaft 108 can advantageously be bridged by meshing gear wheels, and a force flux and/or a torque flux from the input shaft 100 to the output shaft 108 can in particular be established. Moreover, additional functions of the transmission 20, for example additional gears, can be implemented if required by way of a second layshaft 130 and optionally further layshafts.

Figure 4:
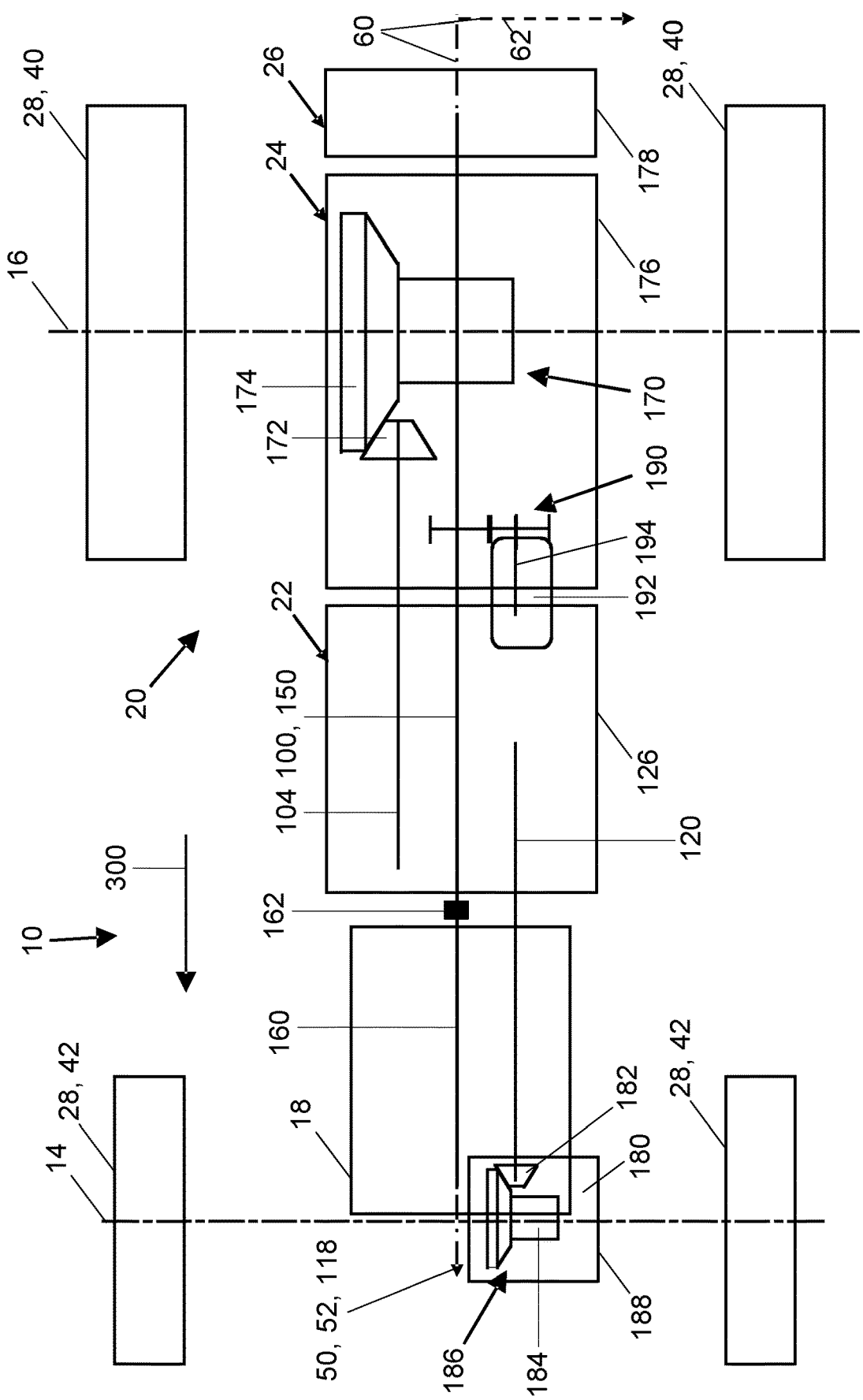
FIG. 4 shows a detailed schematic illustration of the first example embodiment of the commercial vehicle according to the disclosure, having a transmission according to the disclosure.

FIG. 4 shows a detailed schematic illustration of the first example embodiment of the commercial vehicle 10 according to the disclosure, having a transmission 20 according to the disclosure. The commercial vehicle 10 shown in FIG. 4 and the transmission 20 correspond substantially to the commercial vehicles 10 or transmissions 20, respectively, shown in FIGS. 1 to 3, such that only details and/or points of differentiation will be discussed hereunder. Counter to the forward-travel direction 300 of the commercial vehicle 10, and/or along the longitudinal axis 52, and/or in a direction along the transmission central plane 118 or the vehicle central plane 50, respectively, that is parallel to or congruent with the second plane, the components of the commercial vehicle are disposed successively, in particular directly successively and/or adjacent, as follows. First the drive motor 18, then the transmission having the primary transmission unit 22, therebehind the rear axle module 24, and the power take-off module 26 behind the rear axle module 24.

The transmission 20 can additionally comprise a front axle module 180 having a front axle differential 186 and/or a front drive axle 14. The front axle housing 188 can receive the front axle module 180, in particular the front axle differential 186 and/or at least partially the front drive axle 14. The front axle differential 186 can comprise a front axle pinion 182, for example a drive bevel gear or a bevel pinion, as well as a front axle gear wheel 184, for example a bevel gear wheel or crown gear wheel. The rear axle module can comprise the rear axle differential 170 and/or the rear drive axle 16. The rear axle housing 176 can receive the rear axle module 24, in particular the rear axle differential 170 and/or at least partially the rear drive axle 16. The rear axle differential 170 can comprise a rear axle pinion 172, for example a drive bevel gear or a bevel pinion, as well as a rear axle gear wheel 174, for example a bevel gear wheel or a crown gear wheel. The force flux and torque flux can be described as follows. A force/torque flux by the drive motor 18 by way of the crankshaft 160 to the input shaft 100 of the primary transmission unit 22 is first generated. The crankshaft 160 can be connected to, or able to be driven by, either directly the input shaft 100, or by way of a coupling element 162, for example, or by means of a driveshaft (not illustrated), or by way of a splined or screwed connection. As a result, the input shaft 100 is able to be driven by the crankshaft 160, and a force and/or a torque are/is able to be transmitted from the crankshaft 160 to the input shaft 100. The force flux and torque flux is then transferred from the output shaft 104 to the rear axle module and/or to the front axle module 180 such that a rotating movement of the rear and/or front drive axle 14, 16, and thus a movement of the ground-engaging means 28, in particular a rotating movement of the rear and the front wheels 40, 42 is able to be established. However, a force flux and torque flux from the output shaft 104 to the rear axle module, and/or from a further output shaft 120 to the front axle module 180, can also likewise be established or generated, respectively.

The transmission 20 can comprise a transmission housing 126 which receives the primary transmission unit 22, wherein the transmission housing 126 can receive at least the input shaft 100, the output shaft 104, and the first layshaft 108. However, the transmission 20, in particular the primary transmission unit 22, can also comprise a further output shaft 120, as is shown in FIG. 4. The transmission housing 126 can also receive the further output shaft 120. The transmission housing 126 can be configured in such a manner that the rear axle module 24 is disposed on the transmission housing 126, and/or a torque flux between the primary transmission unit 22 and the rear axle model 24 is able to be established. The primary transmission unit 22, in particular the transmission housing 126, can thus be disposed and/or configured in such a manner that the rear axle module 24, in particular the rear axle housing 176, is disposed on the transmission housing 126, the rear axle model 24, for example the rear axle housing 176, in the direction of the force flux and torque flux being in particular disposed downstream of the transmission housing 120.

The transmission 20 moreover comprises a power take-off module 26. The transmission, in particular the power take-off module 26, moreover comprises a power take-off driveshaft 150. The power take-off driveshaft 150 can be connected either directly to the drive motor 20, in particular the crankshaft 160, or by way of a further coupling element, for example, or a splined or screwed connection, or by means of a further driveshaft (not illustrated). As a result, the power take-off driveshaft 150 is able to be driven by the crankshaft 160, and a force and/or a torque are/is able to be transmitted from the crankshaft 160 to the power take-off driveshaft 150. The power take-off driveshaft 150 is disposed in the input shaft 100. The power take-off driveshaft 150 can at least partially be disposed in the primary transmission unit 22, in particular the transmission housing 126, and/or the rear axle module 24, in particular the rear axle housing 176, and/or the power take-off module 26, in particular a power take-off housing 178. The power take-off module 26 can likewise comprise a power take-off shaft stub (not illustrated). The power take-off housing 178 can at least partially receive the power take-off driveshaft 150 and the power take-off shaft stub. As is illustrated in FIG. 4, the rear axle module 24, in particular the rear axle housing 176, is disposed between the power take-off module 26, in particular the power take-off housing 178, and the primary transmission unit 22, in particular the transmission housing 126.

The transmission 20 comprises a pump gear 190. The pump gear 190 is at least partially, in particular completely, disposed in the rear axle module 24, in particular in the rear axle housing 176. Moreover, the pump gear 190 is able to be driven by the power take-off driveshaft 150. A force flux and torque flux from the power take-off driveshaft 150 to the pump gear 190 is thus able to be established, a force and/or a torque being in particular able to be transmitted from the power take-off driveshaft 150 to the pump gear 190.

The transmission 20 comprises a first pump 192, wherein the first pump 192 is able to be driven by the pump gear 190. The first pump 192 comprises a pump shaft 194 which is able to be connected to the pump gear 190 and/or able to be driven by the latter, for example connected and/or able to be driven directly or by way of a splined or screwed connection. The first pump 192 is disposed on the rear axle module 24, for example connected to the rear axle housing 176 or fastened to the rear axle housing 176, in particularly releasably fastened thereto. The transmission can comprise a second pump (not illustrated). The first pump 192 and the second pump can be able to be driven by the pump shaft 194.

In a state in which the transmission 20 is disposed, thus in particular installed, in a commercial vehicle 10, the transmission central plane 118 and the vehicle central plane 50 can be congruent, or the transmission central plane can lie in the vertical axis 54 of the commercial vehicle. The first plane 100 here can be disposed so as to be parallel to or congruent with a reference plane 60 defined by the longitudinal and transverse extent of the commercial vehicle, in particular be disposed so as to be parallel to or congruent with the reference plane 60 defined by the longitudinal axis 52 and a transverse axis 62 of the commercial vehicle 10. The second and the third plane 104, 108 along the vertical axis 54 or the vehicle central plane 50, in particular in a vertical direction of the commercial vehicle 10 along the vertical axis 54 or the vehicle central plane 50, are disposed so as to be offset from the first plane 100 in the direction of a support surface 200 of the commercial vehicle 10. The second plane 104 here is disposed between the first plane 100 and the third plane 108.

Figure 5:
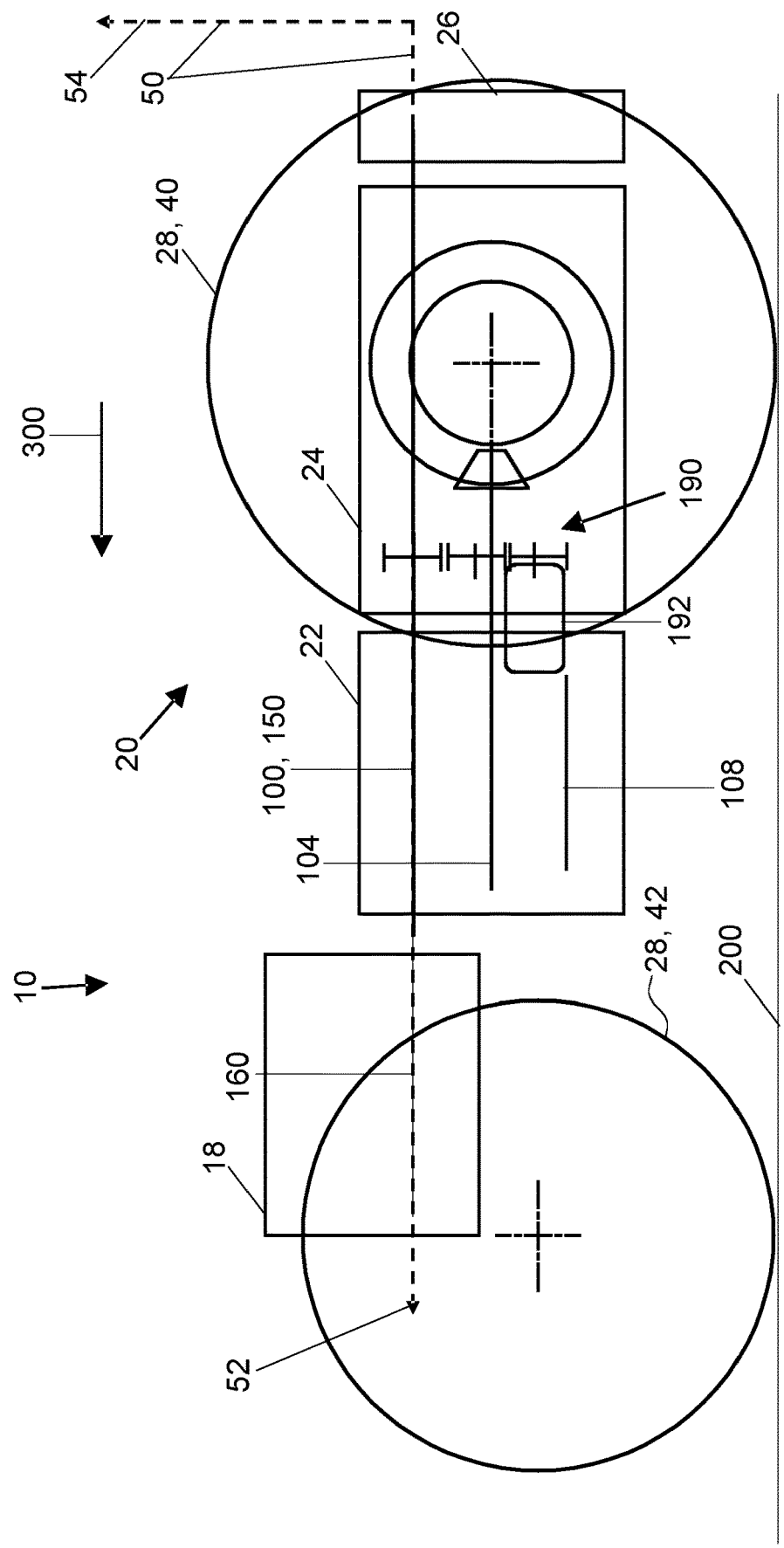
FIG. 5 shows a detailed schematic illustration of the first example embodiment of the commercial vehicle according to the disclosure, having a transmission according to the disclosure.
Figure 6:
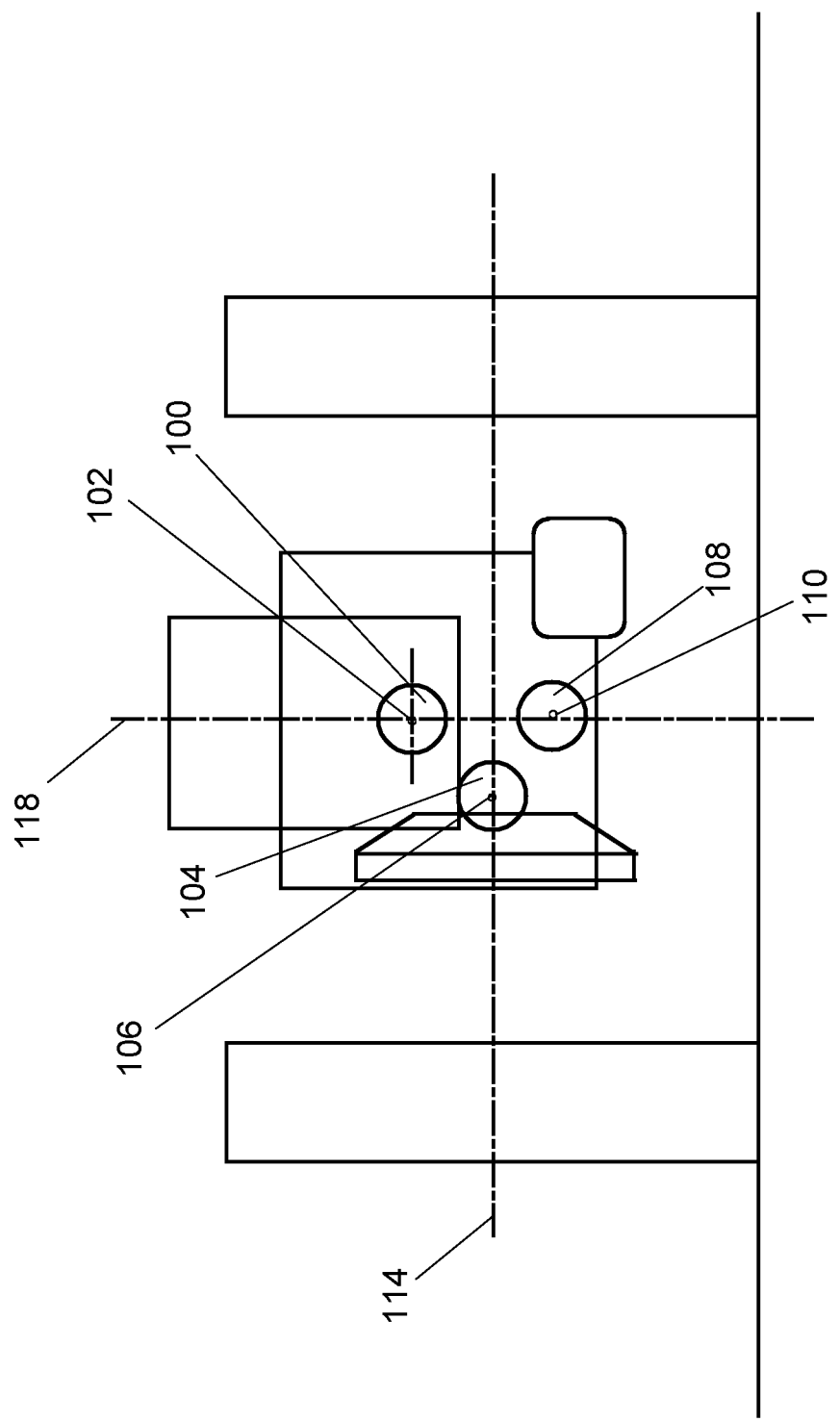
FIG. 6 shows a detailed schematic illustration of the first example embodiment of the commercial vehicle according to the disclosure, having a transmission according to the disclosure.

FIGS. 5 and 6 show a detailed schematic illustration of the first example embodiment of the commercial vehicle 10 according to the disclosure, having a transmission 20 according to the disclosure. The commercial vehicle 10 shown in FIGS. 5 and 6 and the transmission 20 correspond substantially to the commercial vehicles 10 or the transmissions 20, respectively, shown in FIGS. 1 to 4 such that only details and/or points of differentiation will be discussed hereunder. The transmission 20 shown in FIGS. 5 and 6 does not comprise any further output shaft 120 and no front axle module 180 such that a force and torque of the drive motor 18 of the commercial vehicle 10 shown in FIGS. 5 and 6 can be transmitted to the rear drive axle 16 only by way of the output shaft 104.

The advantages mentioned hereunder apply to all figures shown. As a result, the position of the center of gravity of the transmission 20 or of the commercial vehicle 10 along the vertical axis 54 is advantageously displaced in the direction of the support surface 200. The center of gravity in the direction of the support surface 200 is thus in particular displaced in a vertical direction of the commercial vehicle 10 along the vertical axis 54 or the vehicle central plane 50. An optimization of the installation space of the transmission and of the commercial vehicle is advantageously achieved as a result, in particular in terms of a compact construction mode and/or a lightweight construction mode of the commercial vehicle 10. Likewise, additional installation space for components outside the transmission 20 is enabled. Moreover, the cab 12 can be disposed lower down, thus in the direction of a support surface 200 of the commercial vehicle 10, than cabs 12 in known commercial vehicles 10.

The terminology used herein is for describing particular implementations and is not intended to be limiting of the present disclosure. As used herein, the singular forms "a," "an," and "the" are intended to include the plural forms as well, unless the context clearly indicates otherwise. It will be further understood that any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A transmission for transmitting a torque generated by a drive motor to at least one front or rear drive axle of an agricultural or industrial commercial vehicle, comprising:
    at least one primary transmission unit including an input shaft having a first rotation axis, an output shaft having a second rotation axis, and a first layshaft having a third rotation axis;
    a power take-off module and a power take-off driveshaft;
    a rear axle module disposed between the power take-off module and the primary transmission unit; and
    a pump gear at least partially disposed in the rear axle module and configured to be driven by the power take-off driveshaft;
    the input shaft, the output shaft, and the first layshaft being parallel;
    the first rotation axis lying in a first plane, the second rotation axis lying in a second plane, and the third rotation axis lying in a third plane, and the first, the second and the third planes being parallel; and
    the first, the second, and the third planes being orthogonal to a transmission central plane, the first rotation axis being disposed in the transmission central plane, and the second plane being between the first and the third planes.

2. The transmission of claim 1, wherein a first orthogonal spacing between the second and the third planes is at least one quarter of a second orthogonal spacing between the first and the second planes.

3. The transmission of claim 2, wherein a third orthogonal spacing between the second rotation axis and the transmission central plane is at least one quarter of the second orthogonal spacing between the first and the second planes.

4. The transmission of claim 1, wherein the primary transmission unit includes a second layshaft having a fourth rotation axis lying in a fourth plane parallel to the first, the second, and the third planes, and the fourth plane is between the first and the second planes.

5. The transmission of claim 4, wherein a torque flux between the input shaft and the output shaft is configured to be established only indirectly, and a torque flux between the second layshaft and the output shaft is configured to be established only indirectly.

6. The transmission of claim 5, wherein a torque flux between the output shaft and the first layshaft is configured to be established only directly.

7. The transmission of claim 1, wherein the primary transmission unit includes a second output shaft.

8. The transmission of claim 1, further comprising a transmission housing which receives the at least one primary transmission unit, the transmission housing is configured such that the rear axle module is disposed on the transmission housing, and a torque flux between the primary transmission unit and the rear axle module is configured to be established.

9. The transmission of claim 8, wherein the rear axle module includes the rear axle differential, a rear axle pinion, and a rear axle gear wheel.

10. The transmission of claim 1, further comprising:
a first pump being configured to be driven by the pump gear, the first pump being disposed on the rear axle module, the first pump including a pump shaft which is configured to be connected to and driven by the pump gear; and
a second pump, the first and the second pumps being configured to be driven by the pump shaft.

11. An agricultural or industrial commercial vehicle comprising:
a drive motor;
a transmission including at least one primary transmission unit including an input shaft having a first rotation axis, an output shaft having a second rotation axis, and a first layshaft having a third rotation axis;
a power take-off module and a power take-off driveshaft;
a rear axle module disposed between the power take-off module and the primary transmission unit; and
a pump gear at least partially disposed in the rear axle module and configured to be driven by the power take-off driveshaft;
the input shaft, the output shaft, and the first layshaft being parallel;
the first rotation axis lying in a first plane, the second rotation axis lying in a second plane, and the third rotation axis lying in a third plane, and the first, the second and the third planes being parallel;
the first, the second, and the third planes being orthogonal to a transmission central plane, and the first rotation axis being disposed in the transmission central plane; and
the second plane being disposed between the first and the third planes, the transmission being disposed in the commercial vehicle in such a manner that the transmission central plane is substantially parallel to or congruent with a vehicle central plane.

12. The agricultural or industrial commercial vehicle of claim 11, wherein the first plane is disposed to be substantially parallel to or congruent with a reference plane defined by the longitudinal and the transverse extent of the commercial vehicle, and the second and the third planes are disposed to be offset from the first plane in a direction of a support surface of the commercial vehicle.

* * * * *